United States Patent [19]

Koto

[11] Patent Number: 4,546,362

[45] Date of Patent: * Oct. 8, 1985

[54] LOW VOLTAGE INK-JET PRINTHEAD

[75] Inventor: Haruhiko Koto, Shiojiri, Japan

[73] Assignees: Epson Corporation; Kabushiki Kaisha Suwa Seikosha, both of Japan

[ * ] Notice: The portion of the term of this patent subsequent to Feb. 26, 2002 has been disclaimed.

[21] Appl. No.: 394,051

[22] Filed: Jun. 30, 1982

[30] Foreign Application Priority Data

Jul. 2, 1981 [JP] Japan ............................... 56-104289

[51] Int. Cl.⁴ ............................................ G01D 15/18

[52] U.S. Cl. ............................................ 346/140 R

[58] Field of Search .................................... 346/140 R

[56] References Cited

U.S. PATENT DOCUMENTS 4,216,483 8/1980 Kyser et al. .................... 346/140 R
4,233,610 11/1980 Fischbeck et al. ............ 346/140 R
4,284,996 8/1981 Greve ............................ 346/140 R
4,353,078 10/1982 Lee et al. ...................... 346/140 R
4,383,264 5/1983 Lewis ............................. 346/140 R

OTHER PUBLICATIONS

Erik Stemme and Stig-Gorn Larsson, "The Piezoelectric Capillary Injector-A Hydrodynamic Method for Dot Pattern Generation", IEEE Transactions on Electron Devices, vol. Ed-20, No. 1, Jan. 1973, pp. 14-19.

J. D. Beasley, "Model for Fluid Ejection and Refill in an Impulse Drive Jet", Society of Photographic Scientists and Engineers, vol. 21, No. 2, Mar./Apr. 1977, pp. 78-82.

*Primary Examiner*—E. A. Goldberg
*Assistant Examiner*—Gerald E. Preston
*Attorney, Agent, or Firm*—Blum, Kaplan, Friedman, Silberman & Beran

[57] ABSTRACT

An ink-jet printer head comprises a piezoelectric element, a pressurization chamber coupled to the piezoelectric element for containing ink therein, and a nozzle communicating with the pressurization chamber, the piezoelectric element being deformable upon application of a drive voltage V to increase the volume of the pressurization chamber, removal of the driving signal restoring the volume and ejecting ink from the nozzle. The vibratory system including the piezoelectric element has an acoustic capacitance Co selected with respect to the flow passage system including said nozzle, said pressurization chamber and an ink supply passage, so as to minimize the drive voltage V. Drive voltage is related to the capacitance Co, electrical capacitance cp of the piezoelectric element and pressure $\psi$ as follows:

$$V = \sqrt{\frac{2\,\psi^2 Co}{K^2 cp}}$$

K is a constant.

15 Claims, 19 Drawing Figures

FIG. 3a
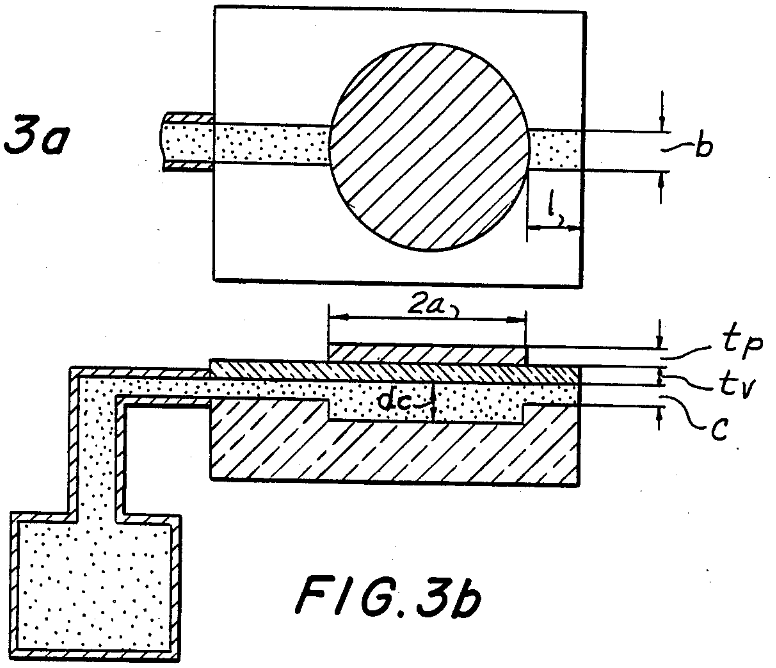
FIG. 3b
FIG. 4a
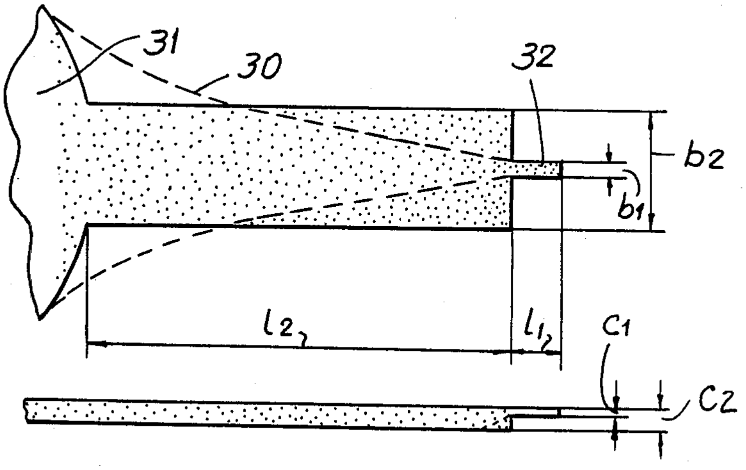
FIG. 4b

LOW VOLTAGE INK-JET PRINTHEAD

BACKGROUND OF THE INVENTION

The present invention relates to an ink-jet printer of the ink-on-demand type, and more particularly to a printing head for such a printer, which is driven by a reduced voltage.

Ink-jet printers of the ink-on-demand type include a piezoelectric element which is deformable upon application of a voltage so as to reduce the volume of a pressurization chamber for ejecting a jet of liquid ink from a nozzle which communicates with the pressurization chamber. Ink-jet printers have been attracting much attention since they consume a small amount of energy and can incorporate a multiplicity of nozzles. Although the structure for ejecting ink is quite simple, it has not been fully analyzed theoretically for the reasons that the ink ejection is effected under transient conditions, and it is difficult to measure the pressure and rate of flow of the ink because the printing head in the printer is small in size.

Various proposals have been made to determine the proper thickness of a vibration plate that contacts with the piezoelectric element to change the volume of the pressurization chamber. Most of the prior efforts base definition of the optimum thickness of the vibration plate only upon consideration of a vibratory system which is constituted jointly by the vibration plate and the piezoelectric element. According to Japanese Laid-Open Patent Publication No. 51-35231, for example, the neutral axes of the vibration plate and piezoelectric element should preferably lie in their median planes, and the thickness of the vibration plate is obtained from the equation:

($Et^2$) of the piezoelectric element=($Et^2$) of the vibration plate;

where E is the modulus of elasticity and t is the thickness of the plate.

A study of the above equation indicates that when the modulus of elasticity of the piezoelectric element is substantially the same as that of the vibration plate, the thickness of the piezoelectric element is substantially the same as that of the vibration plate.

Another prior attempt at analysis relies on a finite-element method to determine the thickness of a vibration plate which allows the maximum displacement of the plate with respect to a given applied drive voltage. This approach also focuses on the vibratory system only, with no consideration given to the ink flow passage to find the optimum thickness of the vibration plate with respect thereto. At any rate, conventional ink-jet printers of the ink-on-demand type have incorporated piezoelectric elements having a thickness tp ranging from about 03 mm to about 0.7 mm, and a vibration plate having a thickness tv which is substantially the same as the thickness tp of the piezoelectric element. The ink-jet printer head as disclosed in the Laid-Open Publication No. 51-35231 requires a relatively high drive voltage of 130 V, but other known ink-jet printers use a lower drive voltage, which, however, still equals several tens of volts or higher. Portable ink-jet printers powered by ordinary electric cells therefore have a voltage booster circuit which is of a high boosting ratio and hence of lower efficiency. This results in a failure to take full advantage of the low energy consumption offered by ink-jet printers.

What is needed is an ink-jet printing head which is driven at lower voltages in order to eliminate a voltage booster circuit. and assures safe operation and has high efficiency.

SUMMARY OF THE INVENTION

Generally speaking, in accordance with the invention, an ink-jet printer operating effectively with low driving voltage is provided. The ink-jet printer head comprises a piezoelectric element, a pressurization chamber coupled to the piezoelectric element for containing ink therein, and a nozzle communicating with the pressurization chamber, the pressurization chamber being expandable upon application of a drive voltage V to the piezoelectric element and contractible upon removal of the signal to thereby eject the ink out of the nozzle. A vibratory system including the piezoelectric element has an acoustic capacitance Co selected with respect to a flow passage system defined partly by the nozzle so as to minimize the drive voltage V, expressed by:

$$V = \sqrt{\frac{2\psi^2 Co}{K^2 cp}}$$

where $$\psi = \frac{Vm\, Am_3\, C\, E}{Co\, f(tn,\tau)}$$

and $f(t,\tau) = -\exp(-Dt)\sin Et + \exp[-D(t-\tau)]\sin E(t-\tau)$; $\tau$ is the width of an applied pulse; t is time; tn represents time which maximized $f(t,\tau)$; $\psi$ is pressure imposed by the piezoelectric element; K is a proportional constant; cp is electric capacitance of the piezoelectic element; Vm is speed of ejection of the ink; A is the cross-sectional area of the nozzle; $m_3$ is fluid inertance of an ink ejection passage including the nozzle and a flow passage interconnecting the pressurization chamber and the nozzle; C is acoustic capacitance taking compressibility in the pressure chamber into account; D is the damping coefficient, and E is angular frequency.

Accordingly, it is an object of the present invention to provide an improved ink-jet printer head which can be driven with reduced voltage and hence consumes a reduced amount of energy.

Another object of the present invention is to provide an improved ink-jet printer head which will operate with increased safety.

Still another object of the present invention is to provide an improved ink-jet printer head having no voltage booster circuit, which as a result is less costly to manufacture, and smaller in size.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1(*b*) is a schematic cross-setional view of a printing head;

FIGS. 3(*a*) and 3(*b*) are plan and cross-sectional views, respectively, of a printing head, illustrating various dimensional constants thereof;

FIGS. 4(*a*) and 4(*b*) are enlarged plan and side elevational views, respectively, of a nozzle of a printing head;

FIG. 5(*b*) is a graph showing a calculated vibration waveform of a piezoelectric element plotted against time:

DESCRIPTION OF THE PREFERRED EMBODIMENT

The inventors of the present invention have analyzed equivalent electric circuit models for printing heads for ink-jet printers and, as a result, have found that the voltage for driving such printing heads can be lowered.

In an ink jet printer head in accordance with the invention, the piezoelectric element is first supplied with a signal for a printing operation to thereby increase the volume of the pressurization chamber. Then this signal is removed in synchronization with the natural frequency of the printing had which frequency is determined by the flow passage and vibratory systems. In addition, the voltage for driving such printing heads is lowered by selecting the vibratory system so as to be best suited for the ink flow passage system.

FIGS. 12(*a*)-(*d*) illustrate the fundamental operation of the printing head in accordance with the invention. FIG. 12(*a*) is a chart showing a waveform of a voltage signal applied to a piezoelectric element 11 and FIGS. 12(*b*)-(*d*) show the configuration of the printing head at times $T_1$, $T_2$ and $T_3$ respectively. At the time $T_1$, as shown in FIG. 12(*b*), a voltage signal is not applied to the piezoelectric element 11 so that a pressurization chamber 1 is filled with ink and keeps a predetermined volume without distorting a vibration plate 12. Upon applying the voltage signal to the piezoelectric element 11 at the time $T_2$, the vibration plate 12 is bent outward, whereby the pressurization chamber 1 increases in internal volume and absorbs ink from a supply of ink (not shown) in the direction of the arrow A. The interval between the time $T_2$ and $T_3$ is determined in accordance with the natural frequency of the printing head which in turn is determined by the flow passages and vibratory systems, as stated above. Upon removal at the time $T_3$ of the voltage signal applied to the piezoelectric element 11, the volume of the pressurization chamber 1 is restored to the original condition. At this moment,some amount of ink is ejected as an ink droplet from the nozzle to form a dot on a recording sheet (not shown) in the known manner.

In an alternative embodiment (not shown) in accordance with the invention at time $T_1$, the vibration plate 12 has already been bent inward. At time $T_2$, the volume of the pressurization chamber 1 is restored to the original condition and ink is absorbed into the pressurization chamber 1 from the ink supply. Then, at time $T_3$, the volume of the pressurization chamber 1 is decreased again to effect ejection of an ink droplet.

Figure 1A:
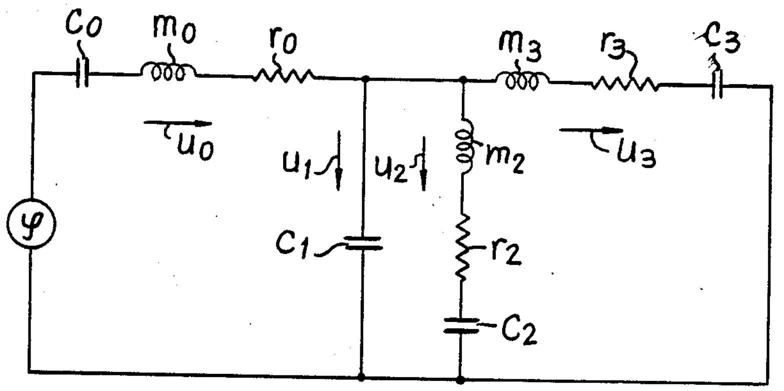
FIG. 1(*a*) is a diagram of an equivalent electrical circuit of a printing head, illustrating principles of the present invention.
Figure 1B:
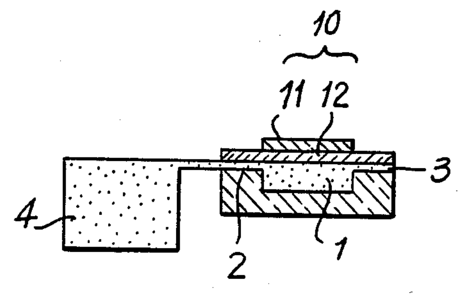
Figure 2:
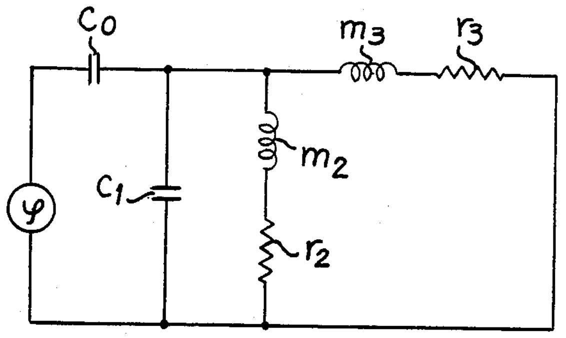
FIG. 2 is a diagram of a simplified equivalent electrical circuit of the printing head of FIG. 1(*b*)

FIG. 1*a* shows an equivalent electric circuit of a printing head, including inertance m, acoustic capacitance C,. and acoustic resistances r. FIG. 1*b* illustrates such a printing head having a vibratory system 10 comprising a piezoelectric element 11 and a vibration plate 12, a pressurization chamber 1 defined below the vibratory system 10, an ink supply passage 2, an ink ejection passage including a nozzle and a flow passage interconnecting the pressurization chamber and the nozzle, and an ink tank 4 from which ink can be supplied into the pressurization chamber 1 through the ink supply passage 2. The subscripts to the parameters shown in FIG. 1*a* are indicative of or correspond to the parts illustrated in FIG. 1*b*, except that $C_2$ denotes the acoustic capacitance of the ink tank 4, $C_3$ the surface tension due to the nozzle and regarded as an acoustic capacitance, and the subscript "0" indicates the vibratory system 10. Units and symbols used are as follows: $\psi$ pressure: $N/m^2$; u volume velocity $m^2/S$; m inertance: $Kg/m^4$; C acoustic capacitance: $m^5/N$; r acoustic resistance: $Ns/m^5$. Actual calculation of the parameters shows that the parameters $m_0$, $r_0$, $C_2$, and $C_3$ are negligible, and the equivalent circuit of FIG. 1*a* can thus be reduced to the simplied equivalent circuit illustrated in FIG. 2. Assuming that $m_2=km_3$ and $r_2=kr_3$, where k is a proportional constant, the pressure $\psi$ is a step function. Also assume that Damping coefficient:

$$D=r_3/2m_3 \tag{1}$$

Angular frequency:

$$E=\sqrt{\frac{(1+1/k)}{m_3C}-D^2} \tag{2}$$

a damping oscillation results which may be espressed by:

$$U_3=\frac{\psi Co}{m_3CE}\exp(-Dt)\sin Et \tag{3}$$

where $$C=C_0+C_1 \tag{4}$$

Equation (3) indicates the motion, determined with the pressure $\psi$ regarded as a step function. According to the present invention, it is assumed that rectangular pulses each have a width $\tau$, and actual motion is expressed by:

$$U_3=\frac{\psi Co}{m_3CE}[-\exp(-Dt)\sin Et+\exp[-D(t-\tau)]\sin[E(t-\tau)]] \tag{5}$$

In equation (5), t is varied for a variety of values of $\tau$, and $U_3$ becomes maximum when the following conditions are met:

$$\tau \cong \pi/E \tag{6}$$

$$t = tn = \frac{\pi + \arctan(E/D)}{E} \tag{7}$$

On the assumption that ink is ejected out of a nozzle having a cross-section area A at a speed $V_m$, the pressure $\psi$ required can be expressed by:

$$\psi = \frac{VmAm_3C\sqrt{E^2 + D^2}}{Co\exp(-Dtn)[1 + \exp(D\tau)]} \tag{8}$$

and the volume of ink droplet q can be expressed by:

$$q = \frac{\psi Co[1 + \exp(D\tau)]\exp(-2\pi/D/E)}{1 + (1/k)} \tag{9}$$

The drive voltage V can be expressed as follows:

$$V = \sqrt{\frac{2\psi^2 Co}{K^2 cp}} \tag{10}$$

where cp is electric capacitance of the piezoelectric element, and K is a proportional constant which ranges from 0.1 to 0.3 according to experiment. The capacitance cp may be expressed by the following equation:

$$cp = \epsilon Sp/tp \tag{11}$$

where $\epsilon$ is the dielectric constant, Sp is area of the piezoelectric element, tp is thickness of the piezoelectric element.

Where the piezoelectric element is provided in the shape of a disc, the various parameters can be given as follows:

$$Co = \frac{\pi a^6}{K_1Ep \cdot tp^3 + K_2Ev \cdot tv^3} \tag{12}$$

$$C_1 = \frac{\pi a^2 dc}{Vs^2} \tag{13}$$

$$r = \frac{32ml}{Sd^2} \tag{14}$$

$$m = \frac{l\rho}{S} \tag{15}$$

where Ep is modulus of longitudinal elasticity of the piezoelectric element, Ev is modulus of longitudinal elasticity of the vibration plate, $K_1$, $K_2$ are constants, a is radius of the piezoelectric element, tp is thickness of the piezoelectric element, tv is thickness of the vibration plate, dc is depth of the pressurization chamber, Vs is speed of sound in ink, $\rho$ is density of ink, $\eta$ is viscosity of ink, l is length of the passage, S is cross-sectional area of the passage, and d is diameter of the passage.

Where the passage is of a rectangular cross-section, the equivalent diameter $d \cong 2S/(b+c)$ may be used, where b and c are the sides of the cross-section of the passage.

The above parameters are illustrated in FIGS. 3*a* and 3*b* for the rectangular cross-section.

An example is now given, which has been defined by the foregoing equations. FIGS. 4*a* and 4*b* illustrate the nozzle structure of a printing head fabricated of glass, by etching. A tapering flow passage 30 extending from a pressurization chamber 31 to a nozzle 32 is approximated by a straight flow passage indicated by the solid lines, and the equations (14 ) and (15) are used to derive parameters $m_3$ and $r_3$ when $b_1=80\mu$, $c_1=30\mu$, $l_1=250\mu$, $b_2=300\mu$, $c_2=100\mu$, $l_2=2$ mm, $\eta=1.8$ centipoise, and $\rho=1{,}000$ Kg/m$^3$, as follows: ($\mu$ is microns)

$$m_3 = 1.8\times10^8 \text{ Kg/m}^4$$

$$r_3 = 3.3\times10^{12} \text{ Ns/m}^5$$

For more accurate definition, an integration should be made along the flow passage, or the latter should be divided into smaller segments to obtain the parameters m and r, respectively, for the divided parts, and those parameters should be added together.

Figure 5A:
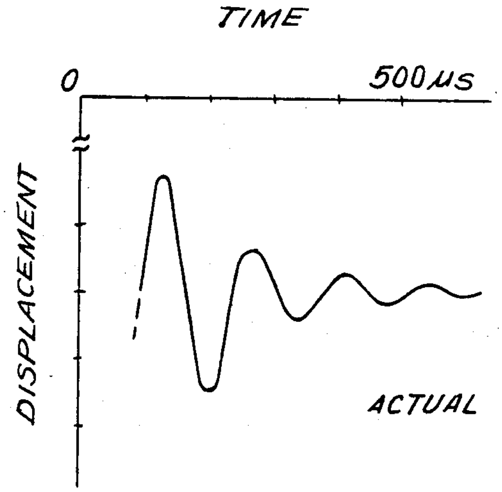
FIG. 5(*a*) is a graph showing an actual vibration waveform of a piezoelectric element.
Figure 5B:
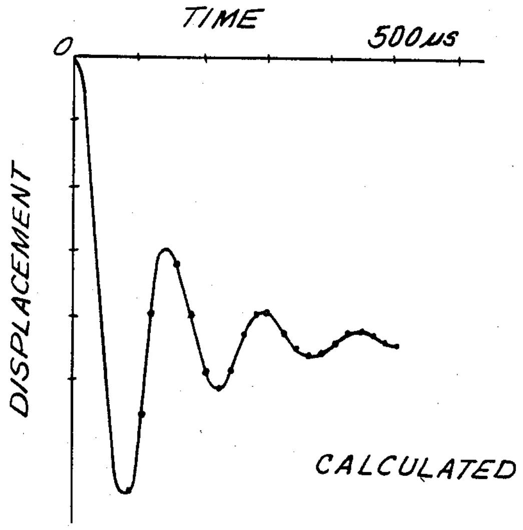

FIGS. 5*a* and 5*b* illustrate an actual waveform of displacement versus time and a waveform plotted by calculation, respectively, of a piezoelectric element formed of a PZT, for a printing head. The parameters and constants are as follows: a=1.25 mm; k=1.3; $r_3=4\times10^{12}$ Ns/m$^5$; $m_3=2.5\times10^8$ Kg/m$^4$; tp=tv=0.15 mm; $C_1=0.22\times10^{-18}$m$^5$/N and $Co=3.45\times10^{-18}$m$^5$/N. Although the actual and theoretical vibration waveforms are not in full agreement with each other since, for example, the actual period of vibration is about 140 microseconds whereas the period of vibration defined by calculation is about 146 microseconds, comparison of both curves indicates that the vibratory movement of the piezoelectric element can be accounted for to a considerable degree by the above theoretical analysis. No measurement has been made of any displacement of the piezoelectric element prior to 100 $\mu$S for the vibratory waveform shown in FIG. 5*a* because of an incompleteness in the measuring process. The vertical axes of the graphs of FIGS. 5*a* and 5*b* do not correspond to each other.

A printing head in accordance with the present invention is now described. The head is designed using the foregoing equations, so as to be drivable at a low voltage.

Figure 6:
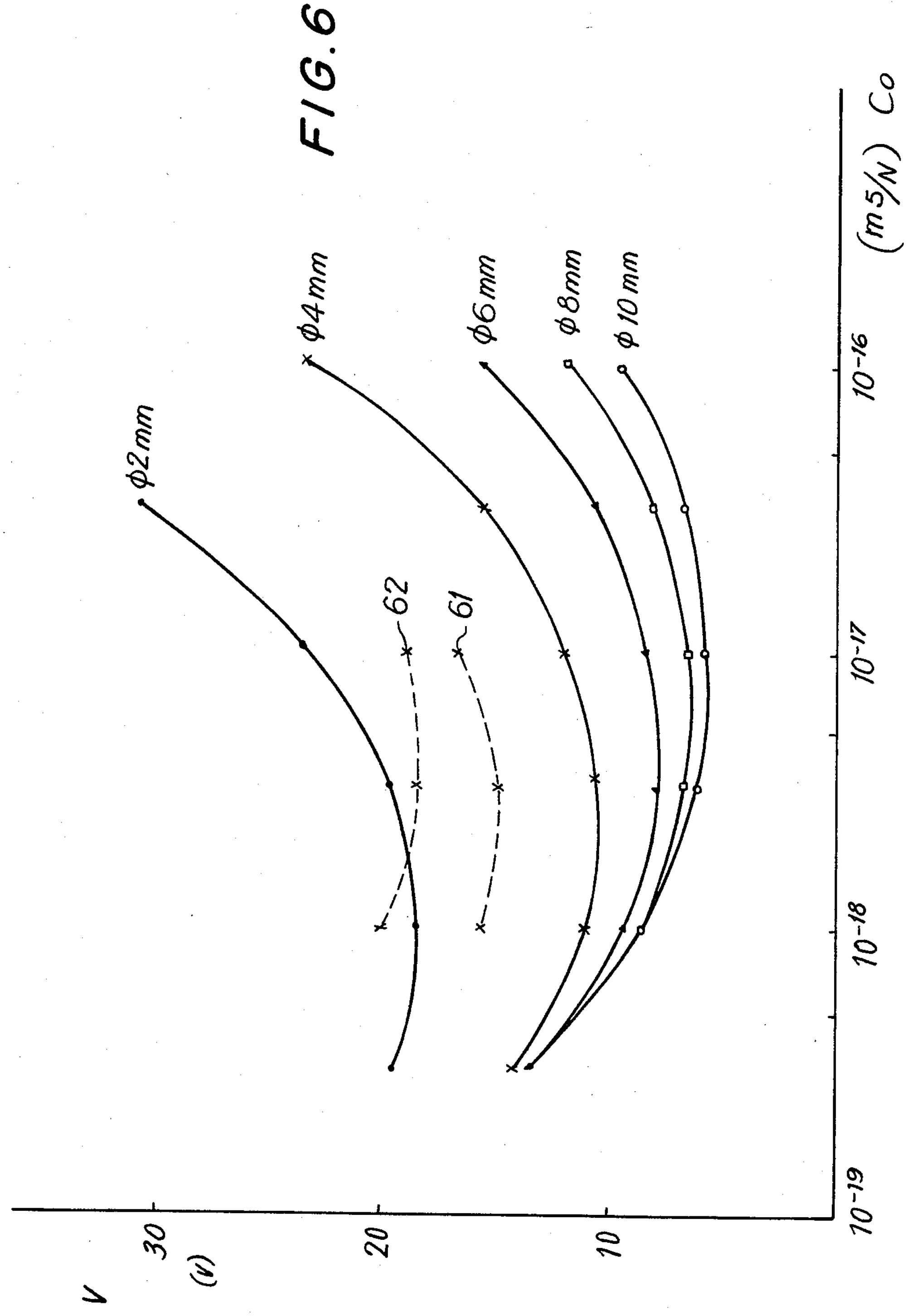
FIGS. 6 through 8 are curves of calculated driving voltages versus different acoustic capacitances of a vibratory system.
Figure 7:
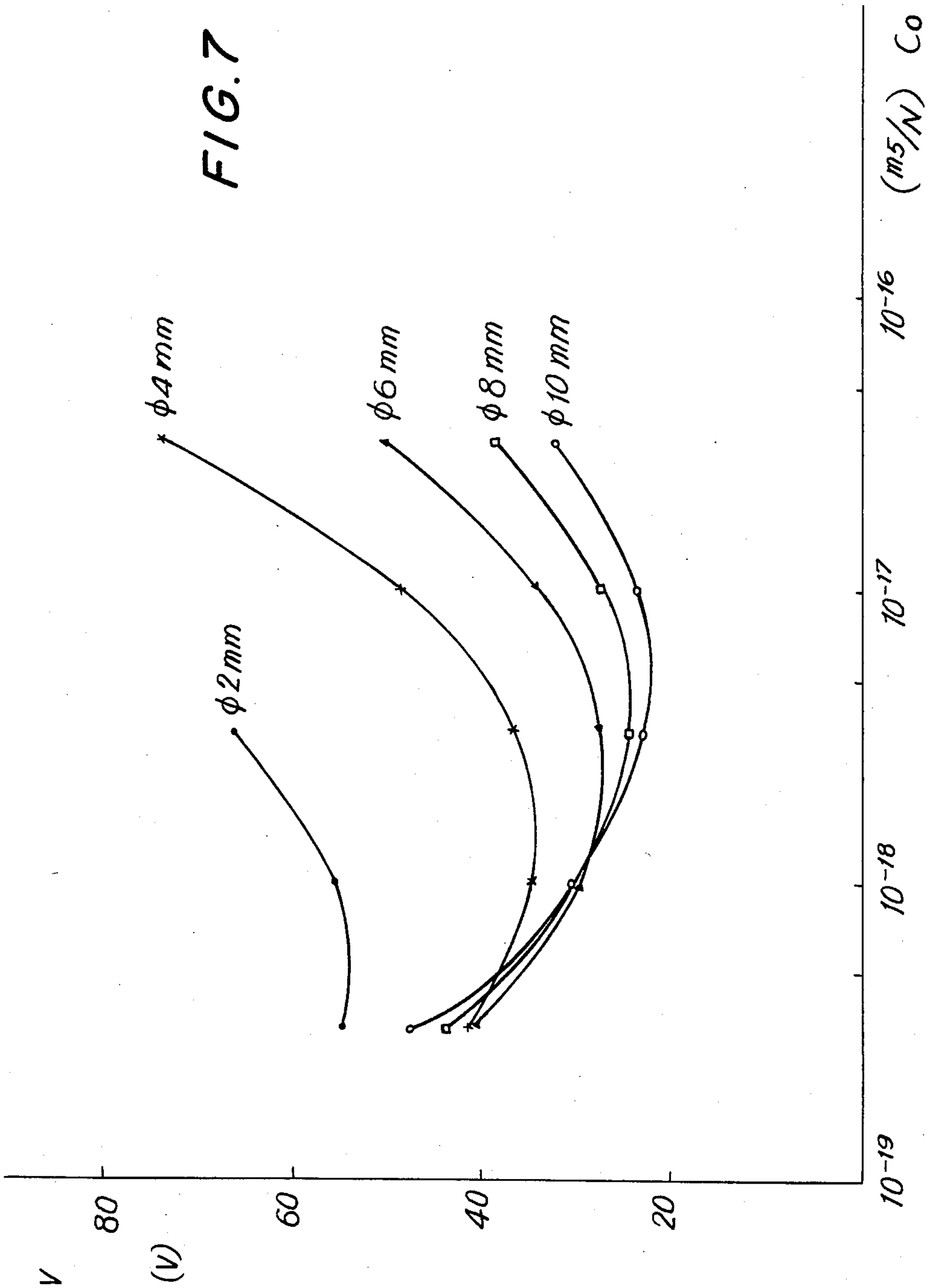

FIGS. 6 and 7 show calculated variations in the drive voltage which result when the acoustic capacitance Co of the vibratory system is changed, while the flow passage system, the thickness of the piezoelectric element, the depth of the pressurization chamber, and the speed of ejection of ink remain constant in the equations (1) through (15). The main parameters and constants are as follows: $\eta=1.8$ cp; dc=0.1 mm; $d=50\mu$; tp=0.15 mm; Vm=5 m/s; K=0.24; $\epsilon=2{,}070\times8.854\times10^{-12}$ F/m; and k=1. FIG. 6 illustrates data obtained when the ink ejection passage has the dimensions $d=50\mu$ and $l=100\mu$, and hence $m_3\cong5\times10^7$ Kg/m$^4$ and $r_3\cong1\times10^{12}$ Ns/m$^5$. FIG. 7 shows data obtained when the ink ejection passage is composed of series-connected passageways, the nozzle having dimensions $d=50\mu$ and the flow passage with $d=500\mu$ and $l_2=10$ mm, and $m_3\cong3\times10^8$ Kg/m$^4$ and $r_3=6\times10^{12}$ Ns/m$^5$.

A review of the graphs of FIGS. 6 and 7 shows that for a given diameter $\phi$ of the piezoelectric element, there is an optimum acoustic capacitance Co which minimizes the drive voltage V. Therefore, where the flow passage system and the piezoelectric element are given, the drive voltage can be minimized by selecting the thickness of the vibration plate and the optimum acoustic capacitance Co. A comparison between FIGS. 6 and 7 indicates that in general, the shorter the ink ejection passage and the smaller the inertance m and acoustic resistance r, the lower the drive voltage.

When the width $\tau$ of a drive pulse is smaller or larger than the value given by equation (6), it does not match the natural frequency of the printing head, resulting in an increased required drive voltage. For example, when the pulse width is reduced to half the noted value for a printing head of 4 mm diameter in FIG. 6, a characteristic curve shown by the broken line 61 results. Doubling the pulse width $\tau$ cancels out the natural frequency of the printing head so that the required drive voltage is further increased. General driving methods, in which the natural frequency of the printing head is not utilized, but where a reduction in the volume of the pressurization chamber is relied on for ejection of ink, require a voltage as illustrated by the broken line 62. It will thus be seen that the arrangement of the present invention lowers the drive voltage needed.

To meet UL safety requirements for a peak value of 42.4 V, the drive voltage is selected so as to be 35 V or below by using a 2 mm diameter piezoelectric element, with the length of the ink ejection passage being 100μ as shown in FIG. 6, or by having Co in the range of $10^{-18}$ $m^5/N \leqq Co \leqq 2\times10^{-18}$ $m^5/N$ for a 4 mm diameter piezoelectric element for a printing head having the high ink ejection passage impedance of FIG. 7. Where a regulated power supply is to be used, a drive voltage of 24 V or below is preferred, and a piezoelectric element of 10 mm with Co in the range of $2\times10^{-18}$ $m^5/N \leqq Co \leqq 10^{-17}$ $m^5/N$ should be used or a printing head having the flow passage system of FIG. 7. The printing head can be directly driven by a number of electric cells connected in series. In actual practice, however, six dry cells are desirable at most, or manganese dry cells producing a total of 9 V or below should preferably be used to drive the printing head. To this end, a 6 mm diameter piezoelectric element in FIG. 6 with Co in the range of $10^{-13}$ $m^5/N \leqq Co \leqq 10^{-17}$ $m^5/N$ should be employed.

Although in the foregoing description the drive voltages have been derived under the condition that ink ejection velocity be equal to 5 m/s, lower drive voltages may be used where the ink ejection is at a lower velocity of 3 m/s. However, the quality of the printed characters becomes poor when the ink is ejected at a speed of 2 m/s or less.

The drive voltage required is governed not only be the speed of ejection of the ink, but also by the volume of ink liquid, which is represented by equation (9). In practice, an optimum acoustic capacitance should first be determined on the basis of the ink ejection speed selected, and then should be modified with the volume of the ink/droplet taken into account. As an example, while the optimum acoustic capacitance Co. is about $4\times10^{-18}$ $m^5/N$ for the piezoelectric element of 6 mm diameter of FIG. 6, the acoustic capacitance may be selected in the range of $1.4\times10^{-18}$ $m^5/N \leqq Co \leqq 1.3\times10^{-17}$ $m^5/N$ if approximately a 10% increase in the drive voltage is permissible. The diameter of the ink droplet may at this time range from 50μ to 65μ though it is about 55μ with $Co = 4\times10^{-18}$ $m^5/N$.

The smaller the thickness tp of the piezoelectric element, the greater the acoustic capacitance thereof, and hence the lower the drive voltage as defined by the equation (10) becomes. The lower limit for the thickness tp of the piezoelectric element is determined by various factors such as the possibility of cracking during formation and assembly of the piezoelectric element. A piezoelectric element of $tp \leqq 0.15$ mm as used in FIGS. 6 and 7 is acceptable in general, but piezoelectric elements having thickness down to 50μ may be used if handled with care. For lowered drive voltages, the thickness tp can be made smaller by depositing a thin film of PZT on a vibration plate.

Figure 8:
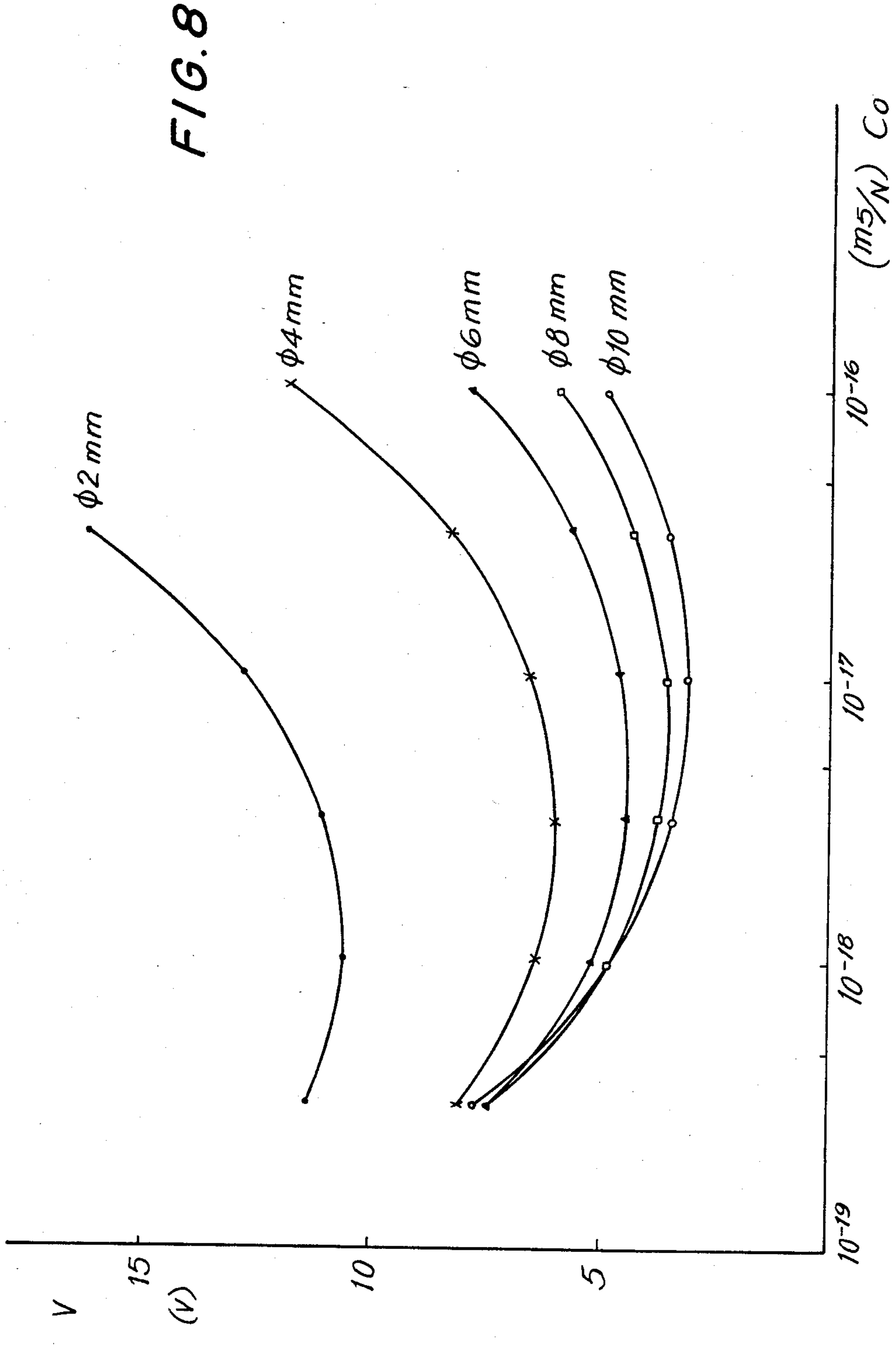

FIG. 8 illustrates data on piezoelectric elements drivable by much lower voltages, with tp=0.1 mm; length of the nozzle $l_1 = 50\mu$; length of the flow passage $l_2 = 0$; $m_3 = 2.6\times10^7$ $Kg/m^4$, and $r_3 = 6\times10^{11}$ $Ns/m^5$. A 2 mm diameter piezoelectric element can be driven by a voltage which approximates 10 V by properly selecting Co, and piezoelectric elements of 6 mm, 8 mm and 10 mm can be driven directly by electric cells in the vincity of $Co = 10^{-17}$ $m^5/N$. The length $l_1$ of the nozzle should not be too small since nozzles of too short a length render themselves irregular in shape during the fabricating process and adversely affect the operating characteristics of the printing heads. Thus, nozzles having a length less than 50μ are not preferred from the standpoint of mass production of printing heads. As described above, according to FIGS. 6, 7 and 8, when the piezoelectric element has 6 mm or less diameter, if the diameter is increased, the drive voltage is decreased at a larger rate. However, in the case of the piezoelectric element having more than 6 mm diameter, the increment of the diameter is accompanied with the decrease of the drive voltage at a smaller rate.

Figure 9:
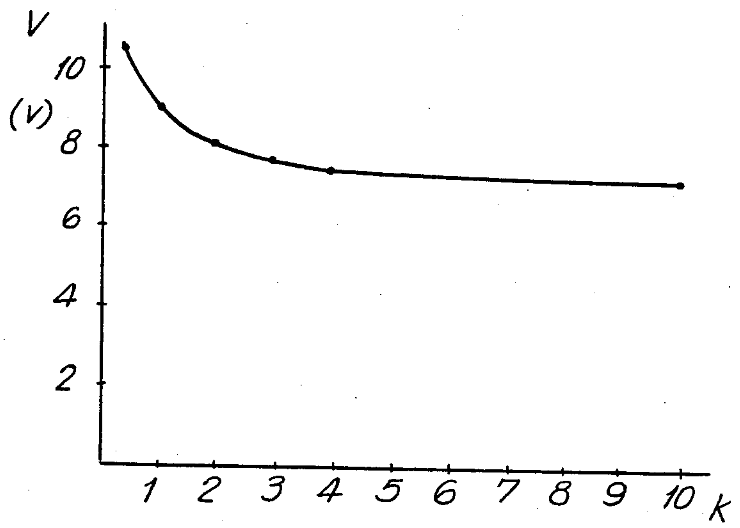
FIG. 9 is a graph showing calculated driving voltages versus impedance ratios.

The larger the ratio k between impedances on the supply and ejection sides, as by constricting the supply passage, the lower the drive voltage, since the amount of ink which is forced backwards when flexing the piezoelectric element becomes smaller. However, limiting the supply passage results in a reduced supply of ink, causing the diameter of ink droplets as ejected to be smaller and lowering the responsivenss of the printing head. Therefore, increasing the ratio k adversely affects the responsiveness of the printing head. FIG. 9 illustrates the change of the drive voltage with the change of the impedance ratio k with length of the ink ejection passage $l = 100\mu$; thickness of the vibration plate tp=0.1 mm, and a 0.4 mm diameter piezoelectric element. A study of FIG. 9 shows that beyond a point, drive voltage is not lowered even if the ratio k is increased. Thus, the ratio k should preferably be in the range of approximately 0.5 to 3.0 to maintain the required degree of responsiveness.

By definition, the acoustic capacitance C, the pressure $\psi$, and the volume variating q having the relationship $\psi = q/C$. The acoustic capacitance Co of the vibratory system according to the present invention is defined by the ratio of the volume variation to the pressure when the pressurization chamber is subjected to pressure. The approximate expression (12) given above for Co for a disc-shaped piezoelectric element varies with the means by which the vibration plate is circumferentially fixed, the properties and thickness of the adhesive by which the vibration plate and the piezoelectric element are bonded to one another, and the configuration of the pressurization chamber. For example, the following equation $$Co = \frac{\pi a^6}{K_1 Ep(tp + K_2 tv)^3} \quad (12)'$$

better matches experimental data in certain instances. In applicants experiments, $K_1 \fallingdotseq 3$ and $K_2$ is given by the expression $$K_2 \cong \sqrt[3]{Ev/Ep}\ .$$

Accordingly, in the case that a vibration plate is made of plastic having approximately $3 \times 10^9$ N/m$^2$ in elastic rate, $K_2 \cong 0.4$. In the case that a vibration plate is made of glass having $6 \times 10^{10}$N/m$^2$ in elastic rate, which value is almost the same as that of the piezoelectric element, $K_2 \cong 1$. For a stricter definition, each printing head can be analyzed by a finite-element method.

Figure 10:
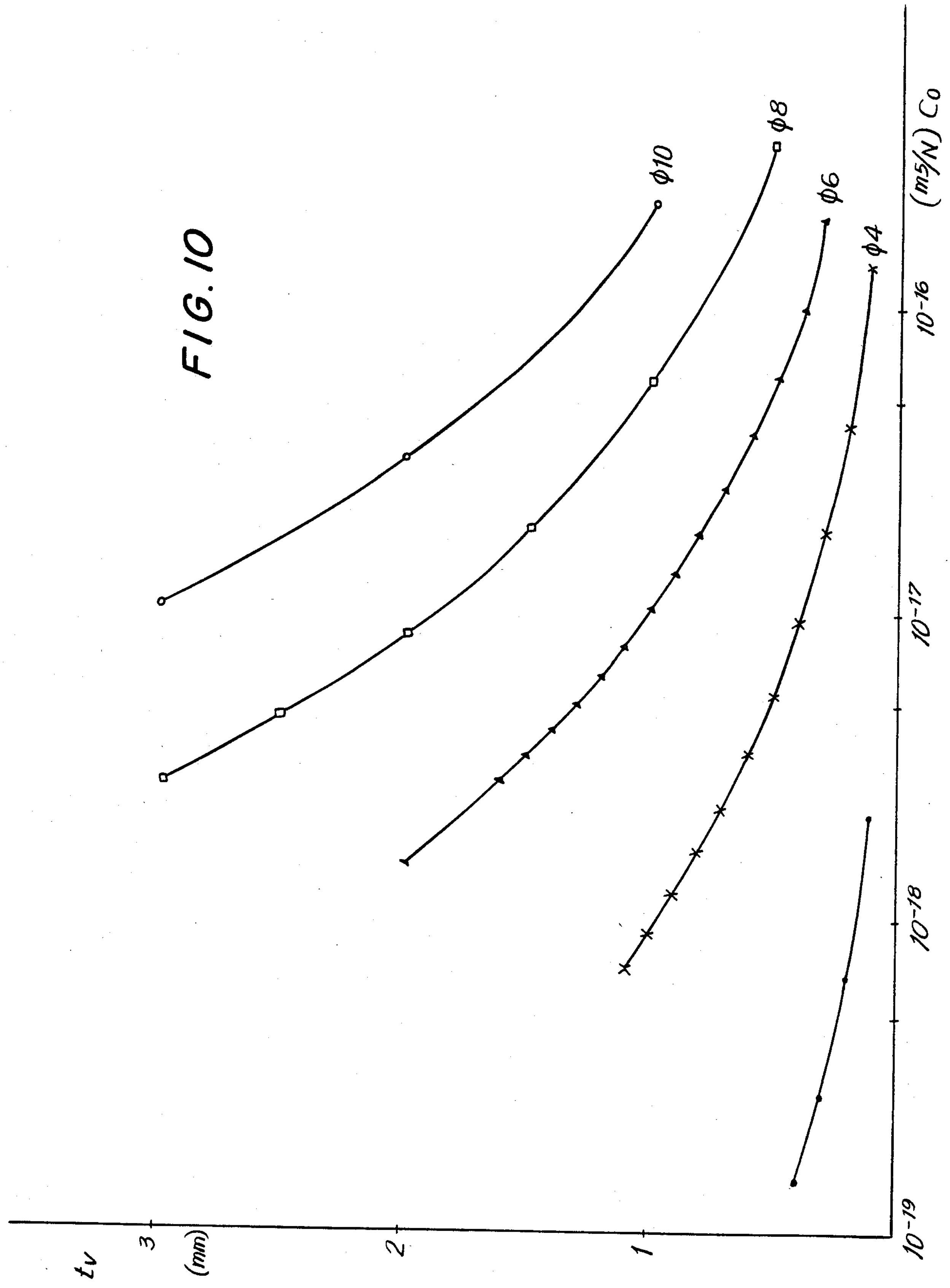
FIG. 10 is a graph showing the relationship between the thickness of the vibration plate and the acoustic capacitance thereof.
Figure 12A:
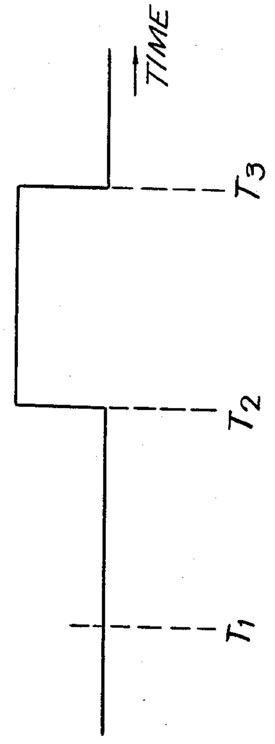
FIGS. 12(*a*)-(*d*) illustrate fundamental operation of a printing head in accordance with the present invention.
Figure 12B:
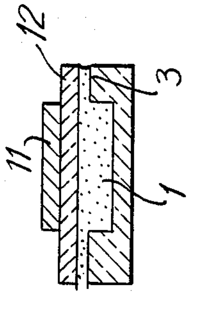
Figure 12C:
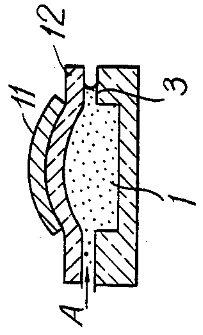
Figure 12D:
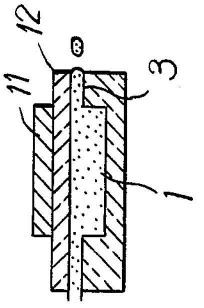

FIG. 10 shows the relationship, defined using the equation (12)', between the thickness tv or a glass vibration plate ($Ev = 6 \times 10^{10}$N/m$^2$) and the acoustic capacitance Co where the piezoelectric elements used have a thickness tp=0.1 mm. According to FIG. 8, if $1 \times 10^{-18} \leqq Co \leqq 1 \times 10^{-17}$ and preferably $Co = 3 \times 10^{-18}$ for 4 mm diameter piezoelectric element, the piezoelectric element is drivable by low voltage. Similarly, if $1 \times 10^{-18} \leqq Co \leqq 5 \times 10^{-17}$ and preferably $5 \times 10^{-18} \leqq Co \leqq 1 \times 10^{-17}$ for 6, 8 or 10 mm diameter piezoelectric element, the piezoelectric elements are also drivable by low voltages. Accordingly, seeing FIG. 10 to get values of tv corresponding to abovementioned Co respectively, in respect of the 4 mm diameter piezoelectric element, 0.4 mm$\leqq$tv$\leqq$1 mm and preferably tv=0.5 mm. In respect of the 6 mm diameter piezoelectric element, tv$\geqq$0.5 mm and preferably tv=1.3 mm. In respect of the 8 mm diameter piezoelectric element, tv$\geqq$1.1 mm and preferably tv=1.9 mm. In respect of the 10 mm diameter piezoelectric element, tv$\geqq$1.7 mm and preferably tv=2.9 mm. These values of tv are more than 4 times as compared with the conventional value (tv$\cong$tp=)0.1 mm, particularly preferable values of tv are 5 to 29 times of 0.1 mm. Namely, if the thickness tv of the vibration element is greatly increased with the increment of the diameter of the piezoelectric element, it will be possible to provide an ink-jet printer comprising an ink-jet printer head drivable by much lower voltage. A vibration plate made of plastic has an increased thickness tv for a given acoustic capacitance Co.

The printing head of the present invention is advantageous in that it can be driven by a low voltage by selecting a vibratory system which is best suited for the flow passage system used, and the printing head will operate more safely. The efficiency of a voltage booster circuit, if employed, is increased by operating at lower voltages. The driver for energizing the printing head can be less expensive to construct. By reducing the flow passage impedance and the thickness of the piezoelectric element and increasing the diameter of the piezoelectric element, the printing head can be directly driven by electric cells without using a voltage booster circuit such as an electromagnetic transformer or a piezoelectric transformer, with the result that the printing head will consume less energy with increased efficiency, and may be made smaller in size and less costly to manufacture.

While in the foregoing embodiments a disc-shaped pressurization chamber is shown and described, printing heads of other shapes may be constructed on the same principles by modifying the equations (12), (13), and others. A pressurization chamber which is too slender has a reduced acoustic capacitance Co, which requires a larger drive voltage. A rectangular pressurization chamber should be dimensioned such that the ratio of the longer side to the shorter side is 2 or less. The piezoelectric element may be fabricated of PZT or other suitable materials. The vibratory system may be constructed of a plurality of piezoelectric elements such as bimorph cell, to lower the drive voltage.

Figure 11:
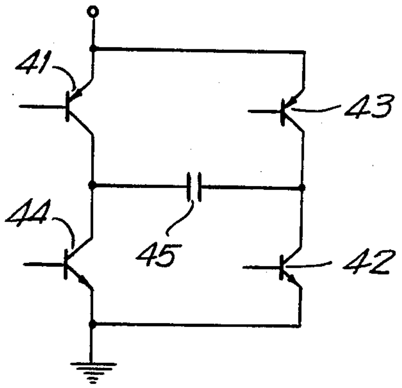
FIG. 11 is a diagram of an electronic circuit for driving an ink-jet head in accordance with the present invention.

As shown in FIG. 11, a piezoelectric element 45 may be charged in one direction by transistors 41, 42 and, during the printing operation, may be charged in the opposite direction by transistors 43, 44, so that the apparent drive voltage available doubles the voltage from the power supply. Stated otherwise, the driving arrangement as illustrated in FIG. 11 requires drive voltage sources which are half the voltage required by the foregoing embodiments, an arrangement which is more advantageous in decreasing the power supply voltage and hence, is best suited for use in small-size printers for electronic calculators.

Where drive signals of waveforms other than rectangular waveforms are employed, the foregoing equations may be modified to derive optimum values of Co as with the above embodiments.

Signals to be applied to the piezoelectric element may be either positive or negative depending on the polarity of the piezoelectric element. From the standpoint of providing a required degree of dielectric strength, the signals to be supplied should be of such a polarity as to cause the piezoelectric element to be contracted.

In summarizing, the impedance of the flow passage system, the thickness of the piezoelectric element, the area of the piezoelectric element, and the ratio between impedances on the supply and ejection sides are related to one other. When the ink ejection passage impedance is large with other conditions remaining the same, it is necessary to increase the area of the piezoelectric element. Thus, these parameters are dependent on one another and cannot be optimally determined without regarding the other parameters. Limits for the parameters however are as follows: for the ink ejection passage impedance, $m_3 \leqq 5 \times 10^8$ Kg/m$^4$ and $r_3 \leqq 5 \times 10^{13}$ Ns/m$^5$; for the thickness of the piezoelectric element, tp$\leqq$0.3 mm; for the area of the piezoelectric element, a$\geqq$1 mm (where a is the piezoelectric element radius), and for the impedance ratio, k$\geqq$0.3. Especially for lowered drive voltages, it is preferable that $m_3 \leqq 10^8$ Kg/m$^4$; $r_3 \leqq 2 \times 10^{12}$ Ns/m$^5$, tp$\leqq$0.15 mm; a$\geqq$2 mm; and k$\leqq$1. The smaller the inertance $m_3$, ink ejection passage resistance $r_3$ and thickness tp of the piezoelectric element, the lower the drive voltage required for printing heads having the same nozzle diameter. The larger the radius a of the piezoelectric element and the impedance ratio k, generally the smaller the drive voltage becomes (FIGS. 6–9).

The printing head in accordance with the invention can be driven by a low voltage by reducing the ink ejection passage impedance and the thickness of the piezoelectric element to the smallest possible degree, increasing the area of the piezoelectric element and the ratio between impedances of the supply and ejection sides to the largest suitable degree, and then selecting the acoustic capacitance of the vibratory system which is best suited for the flow passage system. Concretely, if a vibration plate far thicker than has been used for creating the best condition of only the vibratory system is used to be joined with a thin piezoelectric element having a larger area, the drive voltage is reduced into nearly 1/10 as compared with conventional ink-jet printers.

With the construction of a print head in accordance with the invention, the piezoelectric element is first supplied with a signal for the printing operation to thereby increase the volume of the pressurization chamber. Then, this signal is removed in synchronism with the natural frequency of the printing head which frequency is determined by the flow passage and vibratory systems, the vibratory system being selected so as to be optimum for the flow passage system. Thus, drive voltage can be lowered for improved safety and to increase the efficiency of a voltage booster circuit, if any; and the drive used is inexpensive. With no voltage booster circuit necessary, efficiency of energy consumption can be improved, and the ink-jet printer in accordance with the invention can be smaller in size and less costly to manufacture. The printing head can be incorporated in various devices such as printers, plotters, facsimile, and telecopiers, and is particularly suitable for use in portable printing devices powered by electric cells.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink-jet printer head comprising:

a piezoelectric element having an electrical capacitance cp;

a pressurization chamber coupled to said piezoelectric element for containing ink therein;

an ink ejection passage including nozzle of cross-section A and a flow passage interconnecting said pressurization chamber and said nozzle, said ink ejection passage having fluid inertance $m_3$, said piezoelectric element being deformable upon application of a drive voltage V to increase the volume of said pressurization chamber, and to restore said volume after removal of said drive voltage in synchronization with a damped oscillation of said printer head for ejecting ink from said nozzle;

a vibratory system including said piezoelectric element, said vibratory system having an acoustic capacitance Co;

a flow passage system including said ink ejection passage, said pressurization chamber and an ink supply passage for providing ink to said pressurization chamber, the physical and electrical interrelationships in said ink-jet printer head being represented by the equation $$V = \sqrt{\frac{2\psi^2 Co}{K^2 cp}}$$

where $$\psi = \frac{Vm\, Am_3\, C\, E}{Co\, f(tn,\tau)}$$

and $f(t,\tau) = -\exp(-Dt)\sin Et + \exp[-D(t-\tau)]\sin E(t-\tau)$ $\tau$ is width of an applied pulse, t is time, tn is time which maximizes $f(t,\tau)$, $\psi$ is pressure imposed by the piezoelectric element, K is a proportional constant, Vm is the ejection speed of the ink, A is the cross-sectional area of the nozzle, C is the acoustic capacitance with compressibility in the pressure chamber taken into account, D is the damping coefficient, and E is angular frequency, said acoustic capacitance Co being selected to bring said driving voltage nearly to a minimum value.

2. An ink jet printer head as claimed in claim 1, wherein said acoustic capacitance Co is selected to minimize said driving voltage V.

3. An ink-jet printer head as claimed in claim 1, wherein the width $\tau$ of the applied pulse, the time tn, and the pressure $\psi$ are expressed respectively by the following equations:

$$\tau \cong \frac{\pi}{E}$$

$$t = tn = \frac{\pi + \arctan(E/D)}{E}$$

$$\psi = \frac{VmAm_3C\sqrt{E^2 + D^2}}{Co\exp(-Dtn)[1 + \exp(D\tau)}$$

4. An ink-jet printer head as claimed in claim 1, wherein $\tau$ is selected so as to match natural frequency of the printing head.

5. An ink-jet printer head as claimed in claim 1, wherein said drive voltage V is provided directly from one or more electric cells connected in series.

6. An ink-jet printer head as claimed in claim 4, wherein said drive signals applied to said piezoelectric element are of a polarity causing said piezoelectric element to contract.

7. An ink-jet printer head as claimed in claim 1, wherein said piezoelectric element is a circular disk and said pressurization chamber is a cylinder having a diameter approximating that of said disk.

8. An ink-jet printer head as claimed in claim 3, wherein the diameter of said piezoelectric element is at a fixed selected value, said ink-jet printer head being dimensioned relative to said selected diameter, the acoustic capacitance Co resulting from said dimensioning providing said minimized drive voltage.

9. An ink-jet printer head as claimed in claim 1, wherein said piezoelectric element has a thickness tp not exceeding 0.3 mm and a radius a not less than 1 mm, said flow inertance $m_3$ not exceeding $5\times10^8$ Kg/m$^4$ and an acoustic resistance $r_3$ not greater than $5\times10^{13}$ Ns/m$^5$, said ink supply passage having an inertance and acoustic resistance, the ratio of supply passage inertance to said ink ejection passage inertance $m_3$ being not less than 0.3 and the ratio of supply passage acoustic resistance to said nozzle acoustic resistance $r_3$ being not less than 0.3.

10. An ink-jet printer head as claimed in claim 8, wherein said piezoelectric element has a thickness tp not exceeding 0.3 mm and a radius a not less than 1 mm, said flow inertance $m_3$ not exceeding $5\times10^8$ Kg/m$^4$ and an acoustic resistance $r_3$ not greater than $5\times10^{13}$ Ns/m$^5$, said ink supply passage having an inertance and acoustic resistance, the ratio of supply passage inertance to said ink ejection passage inertance $m_3$ being not less than 0.3 and the ratio k of supply passage acoustic resistance to said nozzle acoustic resistance $r_3$ being not less than 0.3.

11. An ink-jet printer head comprising a pressurization chamber which is formed between first and second base plates one of which is a vibration plate, a nozzle for ejecting ink droplets, an ink ejection passage including said nozzle and a flow passage interconnecting said pressurization chamber and said nozzle, an ink supply passage communicating with said pressurization chamber and a vibratory system which comprises a piezoelectric element disposed on said vibration plate opposite to said pressurization chamber, said pressurization chamber being expandable upon application of a signal to said piezoelectric element and contractible upon removal of said signal in synchronization with a damped oscillation of said printer head to thereby eject the ink from said nozzle, the thickness tv of said vibration plate being such that the fluid inertance $m_3$ of said ink ejection passage is given by the expression:

$$m_3 \leqq 3\times10^8 \text{ Kg/m}^4;$$

the acoustic resistance $r_3$ of said ink ejection passage is given by the expression:

$$r_3 \leqq 6\times10^{12} \text{ Ns/m}^5;$$

the thickness tp of said piezoelectric element is given by the expression:

$$tp \leqq 0.3 \text{ mm};$$

the area sp of said piezoelectric element is given by the expression:

$$sp \geqq 1.2\times10^{-5} \text{ m}^2;$$

the impedance ratio k of the impedance of said ink supply passage and that of said ink ejection passage is given by the expression:

$$k \geqq 0.5;$$

and the acoustic capacitance Co of said vibratory system is given by the expression:

$$1\times10^{-18}\text{m}^5/\text{N} \leqq Co \leqq 1\times10^{-16}\text{m}^5/\text{N}.$$

12. An ink-jet printer head for projecting droplets of ink on demand comprising:

a pressurization chamber for containing ink therein, said pressurization chamber including at least one wall, said wall defining a vibration plate;

an ink supply passage for providing ink to said pressurization chamber;

an ink ejection passage including a nozzle for ejecting ink therefrom and a flow passage coupled between said pressurization chamber and said nozzle;

a piezoelectric element operatively coupled to said vibration plate, said piezoelectric element being deformable upon application of a drive signal to increase the volume of said pressurization chamber, and to restore said volume after said drive signal is removed in synchronization with a damped oscillation of said printer head for ejecting ink from said nozzle;

said ink ejection passage having a flow inertance $m_3$ and an acoustic resistance $r_3$ in the following ranges:

$$m3 \leqq 5\times10^8 \text{kg}/m^4$$

$$r3 \leqq 5\times10^{13} \text{Ns}/m^5,$$

said piezoelectric element having a thickness tp in the following range:

$$tp \leqq 0.3 \text{ mm};$$

and an impedance ratio k between impedances in said ink supply and ejection passages being in the following range:

$$0.5 \leqq k \leqq 3.0.$$

13. The ink-jet printer head, as claimed in claim 12, wherein said ink ejection passage has the flow inertance $m_3$ and the acoustic resistance $r_3$ in the following ranges:

$$m3 \leqq 10^8 \text{kg}/m^4$$

$$r3 \leqq 2\times 1212 \text{Ns}/m^5, \text{ and}$$

said piezoelectric element having the thickness tp in the following range:

$$tp \leqq 0.15 \text{ mm}.$$

14. The ink-jet printer head, as claimed in claim 13, wherein said ink ejection passage has flow inertance $m_3$ and acoustic resistance $r_3$ in the following ranges:

$$m3 \leqq 5\times10^7 \text{kg}/m^4$$

$$r3 \leqq 1\times10^{12} \text{Ns}/m^5; \text{ and}$$

said piezoelectric element having the thickness in tp the following range:

$$tp \leqq 0.15 \text{ mm}.$$

15. An ink-jet printer head for projecting droplets of ink on demand comprising:

a pressurization chamber for containing ink therein, said pressurization chamber including at least one wall, said wall defining a vibration plate;

an ink supply passage for providing ink to said pressurization chamber;

an ink ejection passage including a nozzle for ejecting ink therefrom and a flow passage coupled between said pressurization chamber and said nozzle;

a piezoelectric element operatively coupled to said vibration plate, said piezoelectric element being deformable upon application of a drive signal to increase the volume of said pressurization chamber, and to restore said volume after said drive signal is removed in synchronization with a damped oscillation of said printer head for ejecting ink from said nozzle, said piezoelectric element having a thickness tp in the following range:

$$tp \leqq 50\mu,$$

said piezoelectric element being formed on said vibration plate by a thin film technique.

* * * * *